Figure 1:
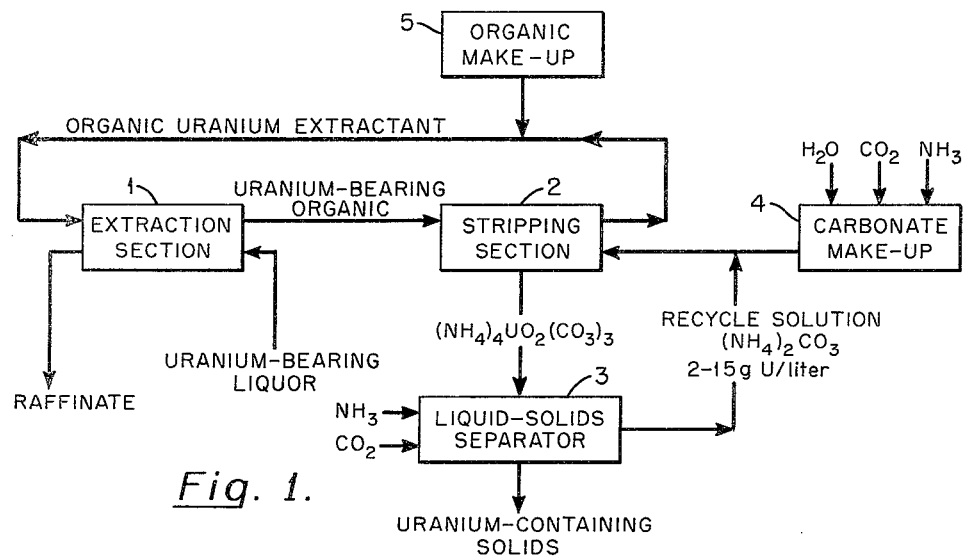

Sept. 4, 1962     D. J. CROUSE, JR     3,052,513

STRIPPING OF URANIUM FROM ORGANIC EXTRACTANTS

Filed April 28, 1960

INVENTOR.
David J. Crouse, Jr.
BY
ATTORNEY

United States Patent Office 3,052,513
Patented Sept. 4, 1962

3,052,513
STRIPPING OF URANIUM FROM ORGANIC EXTRACTANTS
David J. Crouse, Jr., Oak Ridge, Tenn., assignor to the United States of America as represented by the United States Atomic Energy Commission
Filed Apr. 28, 1960, Ser. No. 25,488
14 Claims. (Cl. 23—14.5)

This invention relates to methods for recovering uranium values from uranium-bearing aqueous solutions and more particularly to liquid-liquid extraction methods for recovering uranium values.

Liquid-liquid extraction techniques have become highly useful in recovering uranium values from uranium-bearing ores. In a typical extraction process for recovering uranium, the uranium-bearing ore is leached with a mineral acid and the resulting aqueous solution is contacted with a water-immiscible uranium-complexing organic solution whereby a portion of the uranium values transfers from the aqueous phase to the organic phase. The two phases are then separated and the uranium is recovered from the organic phase. There are two fundamentally different methods which have been developed for commercial uranium-ore processing operations to recover uranium values from the organic liquid. In the first method uranium is precipitated from the organic liquid by contacting the uranium-containing organic liquid with an aqueous liquid containing hydroxyl ions. The uranium precipitates as the diuranate and this precipitate can be separated and processed by methods well-known in the art. In the second method uranium is stripped from the uranium-containing organic solution in a water-soluble form by contacting the organic solution with an aqueous solution of a composition which changes the uranium distribution coefficient in favor of the aqueous phase. Uranium can be stripped from some organic solutions (i.e. tributylphosphate) with substantially pure water, while other organic solutions, such as the amines and dialkylphosphoric acids, require the presence of an anion such as nitrate, chloride or carbonate in the aqueous phase to break the organic-uranium complex. In this second method the uranium which has been stripped into an aqueous phase has to be recovered from the aqueous phase. This recovery may be accomplished by evaporation or by a step of precipitating the uranium as the diuranate by providing a source of hydroxyl ions in the aqueous liquid.

Each of the above methods has its disadvantages. In the first method the precipitate which is formed by precipitating uranium with hydroxyl ion directly from the organic liquid is not easily filtered and entrains a portion of the organic liquid, causing a high loss of the relatively expensive organic extractants employed. The second method requires the additional step of stripping into an aqueous phase prior to precipitating the uranium.

It was discovered that at high concentrations of carbonate in a carbonate stripping solution a precipitate sometimes formed which interfered in the subsequent processing of the water-soluble uranium-carbonate complex. Accordingly, in the prior art processes, the flow ratios of the solutions and the carbonate concentration had to be controlled to ensure the retention of the stripped uranium as a water-soluble complex during the stripping step.

In addition to the foregoing disadvantages of the prior art methods of recovering the uranium from the organic liquid, there is an additional problem which arises when the uranium-containing material also contains molybdenum. The uranium extractants currently in use in ore processing operations, i.e., amines and dialkylphosphoric acids, are strong extractants for molybdenum as well as for uranium, and molybdenum is an undesirable contaminant. For instance, it is necessary for some uses to maintain the molybdenum concentration in the uranium product below 0.6 percent by weight. When the aforementioned carbonate stripping agents are utilized, it is necessary to provide a separate uranium-molybdenum separation step in order to reduce the molybdenum concentration below this value. Alternatively a uranium-molybdenum separation may be effected when using amine extractants by contacting the uranium and molybdenum-containing organic liquid with an aqueous solution containing chloride ions. The uranium is thereby stripped while the molybdenum remains in the organic phase. However, a portion of the chloride accompanies the uranium and interferes in the subsequent processing operations, and molybdenum builds up in the organic phase and must be removed by a separate step.

One object of my invention is to provide an improved method for recovering uranium values from an organic liquid containing said values.

Another object of my invention is to provide an improved method for recovering uranium values from an organic liquid by precipitating uranium directly from the organic liquid.

Still another object of my invention is to provide an improved method for separating uranium values and molybdenum values.

Other objects of my invention will become apparent from the following detailed description and the claims appended thereto.

In accordance with my invention, I have provided an improvement in the step of recovering uranium values from a uranium-containing organic solution in a liquid-liquid extraction process for the recovery of uranium values from an acidic aqueous solution containing said values, said process comprising the steps of contacting said acidic solution with an organic uranium-complexing liquid, separating the resulting uranium-containing organic solution from the resulting depleted aqueous solution and recovering uranium values from said separated organic solution. My improvement comprises recovering said uranium values from said organic solution by providing a stripping soultion comprising an aqueous ammonium carbonate solution loaded with uranium values, contacting said uranium-containing organic solution with said stripping solution whereby a precipitate containing uranium values is formed, separating the resulting aqueous slurry from the resulting stripped organic phase and recovering uranium values from said separated aqueous slurry.

My invention provides a method for precipitating uranium from an organic liquid extractant containing uranium values without losing significant quantities of the organic extractant. The uranium-containing precipitate is crystalline and is easily separated from liquids. My process is highly efficient at removing uranium values from an organic solution, two stripping stages being adequate to remove all but insignificant quantities of uranium from the organic phase. The ammonium and carbonate may easily be recovered from the uranium-containing precipitate. In addition to the foregoing advantages, my stripping method separates molybdenum from uranium leaving only a low concentration of molybdenum in the uranium product.

In carrying out my invention a uranium-containing organic solution is contacted with an aqueous ammonium carbonate solution which is loaded with uranium values. The method of obtaining the uranium-containing organic solution is not a part of my invention, a brief description of the processing steps preceding the step of removing uranium from the organic solution being given here, however, for a more complete understanding of my invention.

In a liquid-liquid extraction process for recovering uranium from uranium-containing ores, the ore is leached with an acidic aqueous solution such as a sulfuric or nitric acid solution. The resulting aqueous solution containing uranium values, together with other metal values, is contacted with a uranium-complexing organic solution which extracts uranium values from the aqueous phase. There are many organic compounds which can extract uranium from acidic aqueous solution, and suitable types of compounds are: ethers, glycol ethers, esters, ketones, alcohols, alkylphosphates, amines and dialkylphosphoric acids. Specific examples of suitable organic extractants are: diethyl ether, dibutyl ether of diethylene glycol, ethyl acetate, n-propyl acetate, acetophenone, cyclohexonone, 2-ethyl-1-hexanol, tributyl phosphate, tri-n-octylamine, and di-(2-ethylhexyl)phosphoric acid.

For data on the extraction power for uranium of typical uranium-complexing organic reagents and detailed information concerning the extraction step, reference is made to U.S. Patent Nos. 2,859,094, issued November 4, 1958, to John M. Schmitt, Charles A. Blake, Jr., Keith B. Brown, and Charles F. Coleman for "Uranium Extraction Process Using Synergistic Reagents" which teaches a method of extracting uranium using dialkylphosphoric acids, and 2,877,250, issued March 10, 1959, to Keith B. Brown, David J. Crouse, Jr., and John G. Moore for "Recovery of Uranium Values" which teaches the use of amines as uranium extractants.

The uranium-loaded ammonium carbonate solution which is brought into contact with the uranium-containing organic solution in accordance with my process may be obtained from a variety of sources. For example, the carbonate solution may be obtained by adding a source of ammonium carbonate to an aqueous solution containing uranium values. However, in the preferred form of my invention I have provided a method of recycling an aqueous ammonium carbonate solution whereby the uranium is furnished by the organic solution being stripped of uranium. In this recycle method an aqueous ammonium carbonate solution is brought into contact with a uranium-containing organic solution in a stripping zone, thereby becoming loaded with uranium. This uranium-loaded carbonate solution is separated from the organic solution and removed from the stripping zone; uranium values which have precipitated are separated from the aqueous phase, additional carbonate and ammonium ions are added to the aqueous solution, and this solution, loaded with uranium values, is returned to the stripping zone.

In general, the composition of the uranium-loaded stripping solution may be varied widely. However, ammonium must be the major cation present, and it should be present in the amount of at least approximately sixty percent on a molar basis. The only metal cations which are highly soluble in a uranium-loaded carbonate solution, and which therefore may be present in significant amounts, are the alkali metals. Sodium or potassium or a mixture of these two, for instance, may be present in an amount up to forty percent of the total cation content on a molar basis. However, the presence of the alkali metal cations presents no advantage in my process and it is preferred that the cations consist essentially of ammonium.

The uranium-loaded ammonium carbonate solution may contain a high concentration of anions other than carbonate, the only requirement being that these anions form water-soluble ammonium salts. Sulfate and nitrate are examples of suitable anions which may be present with carbonate. In some uranium extraction processes, such as those employing amines or trialkylphosphates as the uranium extractant, other anions are naturally present in the stripping solution as a result of having been extracted into the organic phase from the original uranium-bearing liquor and subsequently removed together with uranium values from said organic phase into the aqueous stripping solution. The presence of these other anions lowers the concentration of carbonate needed to carry out my process. The sum of the concentration of the anions present must be at least approximately 0.7 molar and the preferred range is from one to two molar. The salt concentration in the aqueous solution may range higher than four molar, the viscosity of the resulting solution limiting its usefulness as higher salt concentrations are reached.

There must be enough carbonate present in the uranium-loaded ammonium carbonate solution to provide the stoichiometric requirements of the precipitate of three moles of carbonate per mole of uranium and it is preferred that the concentration of carbonate be high enough to provide at least six moles of carbonate per mole of uranium.

The pH of the aqueous phase after contact with the uranium-containing organic solution must be above approximately 7.5. A source of hydroxyl ions may be added to maintain the pH at an acceptable level.

For a given salt concentration, the solubility of uranium in a mixture of ammonium salts is approximately the same as its solubility in substantially pure ammonium carbonate. Uranium has an equilibrium solubility ranging from approximately two grams per liter in a solution which is two molar in ammonium carbonate to approximately seven grams per liter in a solution which is 0.7 molar in ammonium carbonate. In a dynamic system the aqueous stripping solution becomes supersaturated in uranium values and the uranium concentration in a dynamic system may be greater than the equilibrium value by a factor of two. Reference herein to a "uranium-loaded" stripping solution is intended to mean a solution containing uranium within the concentration range of substantial saturation to high supersaturation.

The precipitate contains ammonium and carbonate ions together with uranium and the stripping solution would therefore become depleted in these ions if a source of carbonate and ammonium were not provided. Make-up stripping reagent may be added by dissolving ammonia and carbon dioxide in an absorption tower and feeding the aqueous mixture into the recycled stripping solution. This, however, requires the preparation of a highly concentrated solution and a large bleed to prevent build-up of the aqueous volume in the stripping system. In the preferred form of my invention the bulk of the make-up ammonia and carbon dioxide are added directly to the aqueous solution.

For a better understanding of my recycle method, reference is made to the flow diagram of FIG. 1, which shows my stripping method incorporated in a liquid-liquid extraction process. The uranium is extracted from the uranium-bearing liquor by the organic solution in extraction section 1. The organic liquid, containing uranium values, is sent to stripping section 2 where it is contacted with an aqueous ammonium carbonate solution loaded with uranium. Uranium precipitates as $$(NH_4)_4UO_2(CO_3)_3$$

and the resulting aqueous slurry is separated from the organic phase and is sent to liquid-solids separator 3. The liquid which is separated from the uranium solids in separator 3 is loaded with uranium and is recycled to the stripping section 2, sufficient ammonium carbonate solution being added from carbonate solution make-up 4 to provide for the small amount of aqueous solution which is lost. In the preferred manner of carrying out my stripping method ammonia and carbon dioxide are dissolved in the aqueous solution in the separator 3. The flow ratio organic:aqueous in the stripping section 2 is not critical and may suitably be varied over a wide range as long as there is sufficient carbonate present to meet the stoichiometric requirements necessary to precipitate 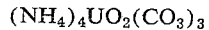 $(NH_4)_4UO_2(CO_3)_3$.

In a preferred form of my invention a second stripping stage and a method of separating molybdenum from uranium values are incorporated in the process. The second stripping stage is incorporated in the process between the carbonate make-up 4 and stripping section 2 of FIG. 1. This second stripping stage serves the dual purpose of removing all but traces of uranium from the organic solution and of adding uranium values to the carbonate make-up solution.

Molybdenum is highly soluble in a carbonate solution and separation from uranium is effected by precipitating uranium values with carbonate. However, in my recycle system molybdenum values will build up in the recycled carbonate solution until the carbonate solution is saturated in molybdenum values unless some method is provided for removing molybdenum. In a preferred form of my invention the concentration of molybdenum in the recycled carbonate solution is maintained below the saturation point by bleeding off a small portion of the recycle solution. The portion bled off may be discarded, but it is preferred to process that solution to separate uranium from the molybdenum contained therein. The bleed may be continuous or intermittent, but a continuous bleed is preferred.

The temperature at which the stripping step is carried out is not critical, but it is preferred to carry out this step at 25–30° C. (room temperature) since a coarser and more easily separated precipitate is formed within this temperature range than at higher temperatures.

A general description will now be given of two different specific stripping processes which I have developed employing a uranium-loaded aqueous carbonate solution as the stripping agent. The first, illustrating a stripping process wherein the salt in the stripping solution is essentially ammonium carbonate, is a process for stripping uranium values from an organic liquid comprised of a dialkylphosphoric acid and a neutral organophosphorus compound in an inert organic diluent in the amounts of from 0.05 to 0.4 molar dialkylphosphoric acid and 0.02 molar to 0.5 molar neutral compound. This organic solution is contacted with an acidic aqueous solution containing uranium values in an extraction stage wherein uranium values are transferred to the organic phase. Further information concerning the extraction of uranium values using this combination of organic reagents may be found in the above-mentioned U.S. Patent No. 2,854,094, issued November 4, 1958. This organic phase, containing 4 to 10 grams of uranium per liter, is contacted in a first stripping stage with a 0.7 to 4 molar ammonium carbonate solution loaded with uranium values. Crystalline ammonium uranyl tricarbonate precipitates, and the aqueous phase and this precipitate are separated from the organic phase. The resulting organic phase, containing uranium in a low concentration, is sent to a second stripping stage.

The aqueous slurry from the first stripping stage is transferred to a vessel where make-up ammonia and carbon dioxide are added and the uranium-loaded ammonium carbonate solution and the uranium-bearing precipitate are separate. Stoichiometric chemical requirements for removal of uranium from the organic phase and precipitation thereof are one mole of ammonia per mole of dialkylphosphoric acid plus four moles of ammonia and three moles of carbon dioxide per mole of uranium recovered. An excess of 5 to 20 percent of this amount should be allowed to compensate for losses. The carbonate solution, containing ammonium carbonate in a concentration of from 0.7 to 4 molar, is recycled to the first stripping stage. The precipitate is calcined to $U_3O_8$.

If molybdenum has been extracted with the uranium and must be removed, a small amount of the recycled aqueous solution may be bled off and the molybdenum and uranium in the bleed solution separated. The incorporation of this step will keep the molybdenum concentration below the level at which it will precipitate. The rate at which the bleed solution should be removed may be determined from the rate at which molybdenum enters the aqueous solution and the maximum concentration of molybdenum desired in the aqueous carbonate solution. Molybdenum, which is present in the form of ammonium molybdate, is extremely soluble in the recycled solution. It is preferred to maintain the molybdenum concentration below approximately 15 grams per liter.

The separation of molybdenum and uranium contained in the solution which is bled off may be accomplished by heating the solution, thus removing ammonia and carbon dioxide. Uranium in the solution precipitates and this precipitate may be separated from the molybdenum-containing supernatant.

The organic phase which has been transferred to a second stripping stage is contacted with an aqueous solution containing ammonium carbonate in a concentration less than 0.8 molar and preferably within a concentration range of from 0.4 to 0.6 molar. Virtually all the uranium remaining in the organic phase is removed in a soluble form by this ammonium carbonate solution. The ammonium carbonate solution from the second stripping stage is mixed with the recycled stripping solution and the mixture is passed into the first stripping stage. The flow rates of the solutions in the second stripping stage may be controlled to maintain the volume of the stripping solution for the first stage approximately constant. The organic phase from the second stripping stage is returned to the extraction stage.

The second stripping process, wherein an amine is employed to extract uranium values from an acidic aqueous uranium-containing liquid, illustrates a process wherein the stripping solution contains ammonium carbonate together with a second ammonium salt and differs from the first process principally in the content of the recycled stripping solution. The sulfate concentration in a recycled uranium-loaded stripping solution builds up to a high level in stripping amine extractants which have been employed in extracting uranium from sulfate-containing ore liquors. The amines in extracting uranium values also extract anions from the acidic aqueous solution. One of the possible forms in which uranium is extracted from an acidic sulfate solution by an amine is represented by $$(R_3NH)_2UO_2(SO_4)_2$$

where $R_3N$ represents a tertiary amine. In the stripping stage the sulfate transfers to the aqueous phase and is recycled as ammonium sulfate. The ammonium sulfate will build up in the aqueous carbonate solution which is recycled to the first stripping stage and acts as a salting-out agent.

The concentration of either the carbonate or the sulfate may be varied over a wide range as long as the concentration of the other anion is suitably adjusted. The sum of the concentrations of the two anions must be at least 0.7 molar and should be less than approximately 4 molar. It is preferred that the sum of the molarities be from 1 to 2. If this criterion is met, the concentration of carbonate may range from that sufficient to provide the stoichiometric requirements of the precipitate of three moles of carbonate per mole of uranium to approximately 4 molar, and a concentration within the range of 0.2 to 0.4 molar is preferred.

The ammonium sulfate may be kept below the level at which it will precipitate and accompany the uranium precipitate by the same bleed technique employed to keep molybdenum in the recycle solution below the saturation point.

The stoichiometric chemical requirements for stripping from an amine extractant are one mole of ammonia per mole of amine plus six moles of ammonia and three moles of carbon dioxide per mole of uranium recovered.

Additional information concerning the extraction of uranium values using amines may be found in the above-cited U.S. Patent No. 2,877,250, issued March 10, 1959.

Contacting the aqueous and organic phases in the stripping step may be accomplished in any mixing device suitable for handling solids and liquids. The solids may be separated from the liquid phase by conventional separating means, such as decanters, filters and centrifuges.

Having thus described my invention, the following examples are offered to illustrate my invention in greater detail.

Example I

Figure 2:
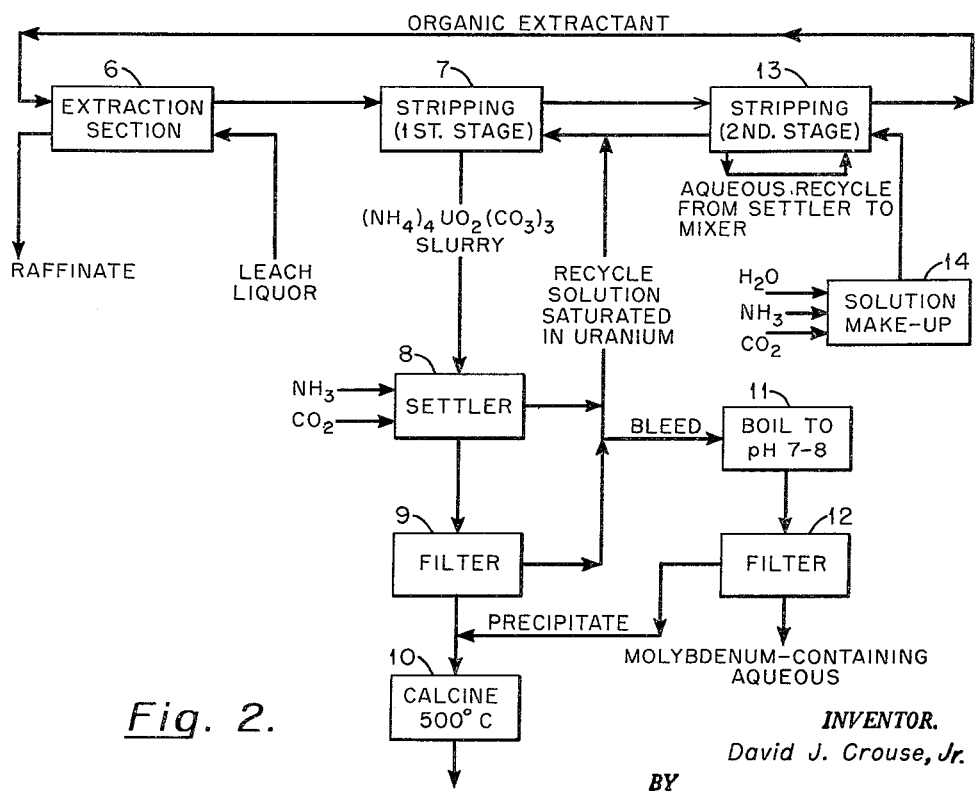

The flow sheet of FIG. 2 was followed in this example. An acid leach liquor and an organic solvent comprised of 0.1 molar di(2-ethylhexyl)phosphoric acid and 0.05 molar diamyl amylphosphonate in kerosene was introduced into extraction section 6 comprised of three extraction stages. The leach liquor, containing 5 grams U, 1–5 grams V, 0.15 gram Mo, 2 grams Fe(II), 0.1–0.4 gram Fe(III), 3 grams Al, 1 gram phosphate and 48 grams sulfate per liter, and having a pH of 1 was introduced at a rate of 75 milliliters per minute and the organic solution was introduced at a rate of 75 milliliters per minute. The resulting organic phase, containing 5 grams of uranium and 0.15 gram of molybdenum per liter was transferred to the first stripping stage 7 where it was contacted with an aqueous solution 1.5 molar in ammonium carbonate and containing 5 grams of uranium per liter. This carbonate solution was introduced into the first stripping stage 7 at a rate of 25 milliliters per minute. Uranium and molybdenum values in the organic phase transferred to the aqueous carbonate solution and uranium precipitated as $(NH_4)_4UO_2(CO_3)_3$. The resulting aqueous slurry was separated from the organic phase and transferred to a settler 8 where ammonia and carbon dioxide were added at the rate of 0.0140 mole per minute and 0.0044 mole per minute, respectively. The supernatant liquid, 1.5 molar in $(NH_4)_2CO_3$ and supersaturated in uranium values was removed from the settler. The thickened slurry was filtered in filter 9 and the resulting uranium-containing precipitate was calcined to $U_3O_8$. The product analyzed 96.2 percent $U_3O_8$, 0.25 percent Mo. 1.0 percent Fe, 0.04 percent $NH_3$, 0.87 percent $CO_2$ and 0.04 percent phosphate.

A portion of the filtrate from filter 9 was bled off at a rate of 0.8 milliliter per minute and the remainder was mixed with the supernatant liquid from the settler 8. The filtrate which was bled off was passed to vessel 11 where it was heated. Ammonia and carbon dioxide were removed from this solution by this method until the pH dropped to about 8 at which point uranium precipitated. The resulting slurry was transferred to filter 12, the precipitate was combined with the precipitate from filter 9, and the aqueous phase containing molybdenum was discarded.

The organic liquid from the first stripping stage 7, containing uranium in a concentration of 0.1 gram per liter, was transferred to a second stripping stage 13 where it was contacted with an aqueous solution 0.5 molar in ammonium carbonate which was introduced into stripping stage 13 at a rate of 2.5 milliliters per minute. Virtually all the uranium remaining in the organic solution was thereby stripped into this carbonate solution and the resulting uranium-depleted organic solution was returned to the extraction section 6. The resulting ammonium carbonate solution was mixed with the aqueous uranium-loaded ammonium carbonate solution from the settler 8 and filter 9 and the resulting mixture was recycled to the first stripping stage 7.

Example II

The flow sheet of FIG. 2 was followed in this example. An organic solution from extraction section 6 comprising 0.06 molar tri-n-octylamine in kerosene containing 2.7 grams of uranium, 4 grams of sulfate and 0.1 gram of molybdenum per liter was introduced into the first stripping stage 7 at a rate of 50 milliliters per minute. This uranium-containing organic solution was contacted in this stripping stage with an aqueous solution 1.5 molar in ammonium sulfate, 0.5 molar in ammonium carbonate, and containing 1 gram of uranium per liter. This aqueous solution was introduced into stripping stage 7 at a rate of 16.8 milliliters per minute. Uranium and molybdenum values in the organic phase transferred to the aqueous phase and uranium precipitated. The resulting aqueous slurry was separated from the organic phase and transferred to the settler 8 where make-up ammonia and carbon dioxide were added at the rate of 0.0063 mole per minute and 0.0015 mole per minute, respectively. The supernatant liquid was removed from the settler 8 and the thickened slurry was filtered and calcined. The product contained over 98 percent $U_3O_8$ and less than 0.05 percent molybdenum.

The filtrate from filter 9 was processed in the same manner as in Example I, the bleed, at a rate of 1.4 milliliters per minute, being sufficient to keep the molybdenum and sulfate concentration in the recycled aqueous stripping solution below the level at which they precipitated.

The amine solution from the first stripping stage 7 was transferred to stripping stage 13 where it was contacted with an aqueous solution 0.25 molar in ammonium carbonate. This aqueous solution was introduced into the stripping stage 13 from solution make-up 14 at a rate of 1.4 milliliters per minute. The stripped amine solution, containing 0.005 gram uranium per liter was recycled to extraction stage 6, and the uranium-containing ammonium carbonate solution was mixed with the aqueous carbonate, sulfate, uranium and molybdenum-containing solution from settler 8 and filter 9. The resulting mixture was recycled to stripping stage 7.

The foregoing description and examples are not intended to restrict my invention and it should be limited only as is indicated by the appended claims.

Having thus described my invention I claim the following:

1. In a liquid-liquid extraction process for the recovery of uranium values from an acidic aqueous solution containing said values comprising the steps of contacting said acidic solution with a water-immiscible organic uranium-complexing liquid, separating the resulting uranium-containing organic solution from the resulting depleted aqueous solution, and recovering uranium values from said separated organic solution, the improvement which comprises recovering said uranium values from said organic solution by providing a stripping solution comprising an aqueous ammonium carbonate solution containing uranium values in a concentration of 1 to 15 grams per liter; contacting said uranium-containing organic solution with said stripping solution, whereby uranium values transfer from said organic solution into said aqueous solution and a precipitate containing uranium values is formed in said aqueous solution; separating the resulting aqueous slurry from the resulting stripped organic phase and recovering uranium values from said separated aqueous slurry.

2. In a liquid-liquid extraction process for the recovery of uranium values from an acidic aqueous solution containing said values comprising the steps of contacting said acidic solution with a water-immiscible organic uranium-complexing liquid, separating the resulting uranium-containing organic solution from the resulting aqueous solution, and recovering uranium values from said separated organic solution, the improvement which comprises recovering said uranium values from said organic solution by providing a stripping solution comprising an aqueous ammonium carbonate solution containing uranium values in a concentration of 1 to 15 grams per liter; contacting said uranium-containing organic solution with said stripping solution, whereby uranium values transfer from said organic solution into said aqueous solution and a precipitate containing uranium values is formed in said aqueous solution; separating the resulting aqueous slurry from the resulting stripped organic phase; separating the precipitate from the uranium-loaded aqueous phase in said slurry;

recovering uranium values from said separated precipitate; providing a source of additional ammonium and carbonate ions in the remaining uranium-loaded aqueous phase and contacting the resulting aqueous phase with additional uranium-containing organic solution.

3. The process of claim 2 wherein the concentration of carbonate ions in the aqueous stripping solution is from 1 to 2 molar.

4. The process of claim 2 wherein the organic uranium-complexing liquid comprises an amine.

5. The process of claim 4 wherein the aqueous stripping solution contains ammonium carbonate in a concentration from 0.2 to 0.4 molar.

6. The process of claim 2 wherein the organic uranium-complexing solution comprises a dialkylphosphoric acid.

7. In a liquid-liquid extraction process for the recovery of uranium values from an acidic aqueous solution containing said values together with sulfate ions comprising the steps of contacting said acidic solution with an organic uranium-complexing liquid comprising an amine, separating the resulting uranium-containing organic solution from the resulting aqueous solution, and recovering uranium values from said separated organic solution, the improvement which comprises recovering uranium values from said uranium-containing organic solution by providing a stripping solution comprising an aqueous ammonium carbonate solution containing carbonate ions in a concentration within the range of from 0.2 to 0.4 molar and sulfate ions in the range of from 0.5 to 3.8 molar and containing uranium values in a concentration of 1 to 15 grams per liter; contacting said uranium-containing organic solution with said stripping solution, whereby uranium values transfer from said organic solution into said aqueous solution and a precipitate containing uranium values is formed in said aqueous solution; separating the resulting aqueous slurry from the resulting stripped organic phase; separating the precipitate from the uranium-loaded aqueous phase in said slurry; recovering uranium values from said separated precipitate; providing a source of additional ammonium and carbonate ions in the remaining uranium-loaded aqueous phase and contacting the resulting aqueous phase with additional uranium-containing organic solution.

8. In a liquid-liquid extraction process for the recovery of uranium values from an acidic aqueous solution containing said values comprising the steps of contacting said acidic solution with a water-immiscible organic uranium-complexing liquid, separating the resulting uranium-containing organic solution from the resulting depleted aqueous solution, and recovering uranium values from said separated organic solution, the improvement which comprises recovering said uranium values from said organic solution by providing a first stripping solution comprising an aqueous ammonium carbonate solution containing uranium values in a concentration of 1 to 15 grams per liter; contacting said uranium-containing organic solution with said stripping solution in a first stripping zone, whereby uranium values transfer from said organic solution into said aqueous solution and a precipitate containing uranium values is formed in said aqueous solution; separating the resulting aqueous slurry from the resulting partially-stripped organic phase; separating the precipitate from the uranium-loaded aqueous phase in said slurry; recovering uranium values from said separated precipitate; contacting the separated, partially-stripped organic phase with an aqueous solution of ammonium carbonate free of uranium values in a second stripping zone, whereby substantially all the uranium values in said organic phase transfer into said aqueous phase; separating the resulting uranium-containing aqueous solution from the resulting stripped organic phase; mixing the uranium-containing ammonium carbonate solution from the second stripping zone with the uranium-loaded aqueous phase from the first stripping zone, and contacting the resulting aqueous mixture with additional uranium-containing organic solution in said first stripping zone.

9. The process of claim 8 wherein the uranium-complexing liquid comprises a dialkylphosphoric acid, the concentration of ammonium carbonate in the aqueous solution in the first stripping zone is 0.7 to 4 molar, and the concentration of ammonium carbonate in the second stripping zone is 0.4 to 0.6 molar.

10. In a liquid-liquid extraction process for the recovery and segregation of uranium values from an acidic aqueous solution containing said values together with molybdenum values comprising the steps of contacting said acidic solution with a water-immiscible liquid organic uranium and molybdenum-complexing compound, separating the resulting uranium and molybdenum-containing organic phase from the resulting aqueous phase, and separately recovering uranium from the resulting uranium and molybdenum-containing organic solution, the improvement which comprises separately recovering said uranium values from said organic solution by providing a stripping solution comprising an aqueous ammonium carbonate solution containing uranium values in a concentration of 1 to 15 grams per liter; contacting said uranium and molybdenum-containing organic solution with said carbonate stripping solution whereby uranium and molybdenum values transfer from said organic solution into said aqueous solution and a precipitate containing uranium values is formed in said stripping solution; separating the resulting aqueous slurry from the stripped organic phase; separating the precipitated uranium values from the uranium-loaded and molybdenum-containing aqueous phase in said slurry; recovering uranium values from said separated precipitate; separating said uranium and molybdenum-containing solution into a major portion and a minor portion; providing a source of additional ammonium and carbonate ions in said major portion and contacting said major portion with additional uranium and molybdenum-containing organic solution.

11. The process of claim 10 wherein the uranium-complexing compound is an amine.

12. The process of claim 10 wherein the uranium-complexing compound is an amine, and the stripping solution contains sulfate ions in a concentration of 0.5 to 3.8 molar and carbonate ions in a concentration of 0.2 to 0.4 molar.

13. The process of claim 10 wherein the concentration of ammonium carbonate in the separate minor portion of the uranium and molybdenum-containing aqueous solution is reduced until a precipitate containing uranium is formed, the resulting precipitate is separated from the remaining molybdenum-containing solution, and uranium values are recovered from said separated precipitate.

14. The process of claim 13 wherein the concentration of ammonium carbonate is reduced by heating the aqueous solution.

References Cited in the file of this patent

UNITED STATES PATENTS

| | | |
|---|---|---|
| 2,813,001 | Ruhoff | Nov. 12, 1957 |
| 2,843,300 | Warf | Aug. 19, 1958 |
| 2,849,281 | McCullough | Aug. 26, 1958 |
| 2,859,094 | Schmitt et al. | Nov. 4, 1958 |
| 2,877,250 | Brown et al. | Mar. 10, 1959 |